United States Patent
Albrecht et al.

(10) Patent No.: US 9,085,098 B2
(45) Date of Patent: Jul. 21, 2015

(54) STRETCH BLOW MOLDING MACHINE WITH RAPID PROTOTYPING COMPONENTS

(71) Applicant: KRONES AG, Netraubling (DE)

(72) Inventors: Thomas Albrecht, Neutraubling (DE); Kaj Fuehrer, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/379,690

(22) PCT Filed: Dec. 28, 2012

(86) PCT No.: PCT/EP2012/077081
§ 371 (c)(1),
(2) Date: Aug. 19, 2014

(87) PCT Pub. No.: WO2013/131597
PCT Pub. Date: Sep. 12, 2013

(65) Prior Publication Data
US 2015/0037453 A1    Feb. 5, 2015

(30) Foreign Application Priority Data
Mar. 6, 2012  (DE) .......................... 10 2012 203 506

(51) Int. Cl.
  *B29C 67/00*  (2006.01)
  *B29C 49/48*  (2006.01)
  (Continued)

(52) U.S. Cl.
  CPC ............. *B29C 49/08* (2013.01); *B29C 49/4268* (2013.01); *B29C 49/4289* (2013.01);
  (Continued)

(58) Field of Classification Search
  CPC .... B29C 67/0051; B29C 49/12; B29C 49/48; B29C 49/58; B29C 49/4823; B29C 2049/4897
  See application file for complete search history.

(56) References Cited

U.S. PATENT DOCUMENTS 2,573,337 A * 10/1951 Hyde ............................. 428/447
3,358,061 A * 12/1967 Gidge et al. .................. 264/548
(Continued)

FOREIGN PATENT DOCUMENTS

CA    2179323 A  * 12/1997
DE    19753530 A1    6/1999
(Continued)

OTHER PUBLICATIONS

International Search Report for Application No. PCT/EP2012/077081, dated May 23, 2013.
(Continued)

*Primary Examiner* — Robert B Davis
(74) *Attorney, Agent, or Firm* — Marshall, Gerstein & Borun LLP

(57) ABSTRACT

A method for producing a component for a blow molding module of a stretch blow molding machine which as a component to be produced includes at least one of a blow valve, a blow nozzle, a valve block, a stretching rod, a mold carrier, a shell mold one or more single- or multi-part mold inlay(s) with a container contour, and which entails that the component to be produced is completely or partly produced by use of an additive rapid prototyping method, for example by 3D printing or laser sintering, and is produced from one or more of metal, plastic materials, ceramic materials, or from a combination of metal, plastic materials and/or ceramic materials.

21 Claims, 6 Drawing Sheets

(51) Int. Cl.
*B29C 49/42* (2006.01)
*B29C 49/08* (2006.01)
B29C 49/12 (2006.01)
B29C 49/58 (2006.01)

(52) U.S. Cl.
CPC ......... *B29C49/4823* (2013.01); *B29C 67/0051* (2013.01); *B29C 49/12* (2013.01); *B29C 49/48* (2013.01); *B29C 49/58* (2013.01); *B29C 2049/483* (2013.01); *B29C 2049/4897* (2013.01); *B29K 2901/00* (2013.01); *B29K 2905/00* (2013.01); *B29K 2909/02* (2013.01)

(56) References Cited

U.S. PATENT DOCUMENTS

| | | | |
|---|---|---|---|
| 5,458,825 A | | 10/1995 | Grolman et al. |
| 5,494,426 A | * | 2/1996 | Ibar .................................. 425/3 |
| 5,609,922 A | * | 3/1997 | McDonald ................... 427/447 |
| 5,952,018 A | * | 9/1999 | Beldue et al. ................ 425/556 |
| 6,116,888 A | | 9/2000 | Johnston et al. |
| 6,746,225 B1 | * | 6/2004 | McHugh ....................... 425/130 |
| 2004/0142054 A1 | * | 7/2004 | Feng et al. .................... 425/130 |
| 2004/0245678 A1 | * | 12/2004 | Belcher ........................ 264/529 |
| 2008/0181982 A1 | | 7/2008 | Lane |
| 2011/0079940 A1 | * | 4/2011 | Schroers et al. .............. 264/535 |

FOREIGN PATENT DOCUMENTS

| | | |
|---|---|---|
| DE | 19926322 A1 | 12/2000 |
| DE | 10013474 A1 | 9/2001 |
| DE | 10025804 A1 | 11/2001 |
| DE | 10159456 A1 | 6/2002 |
| DE | 10336923 A1 | 3/2005 |
| DE | 102006050396 A1 | 4/2008 |
| WO | WO-2008/138302 A1 | 11/2008 |
| WO | WO-2010/056705 A2 | 5/2010 |

OTHER PUBLICATIONS

German Search Report for Application No. 102012203506.0, dated Apr. 27, 2012.

* cited by examiner

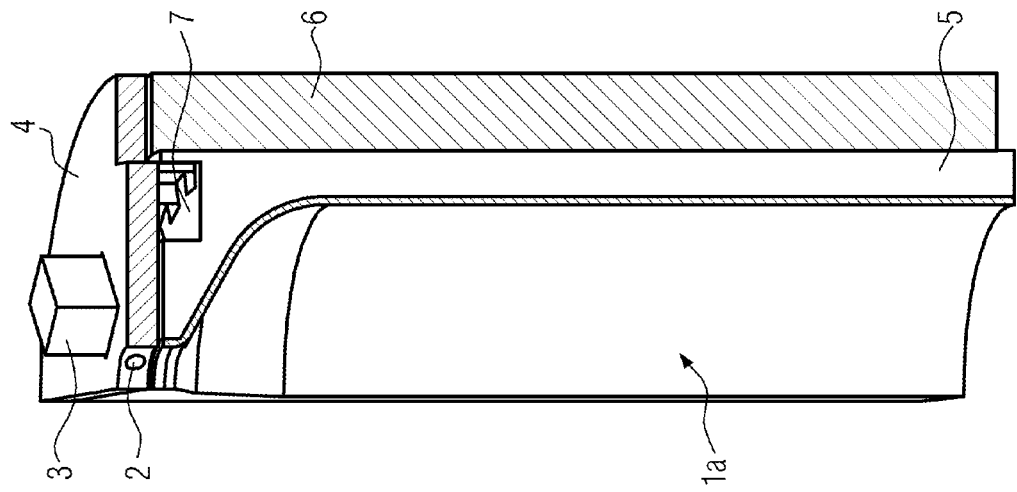
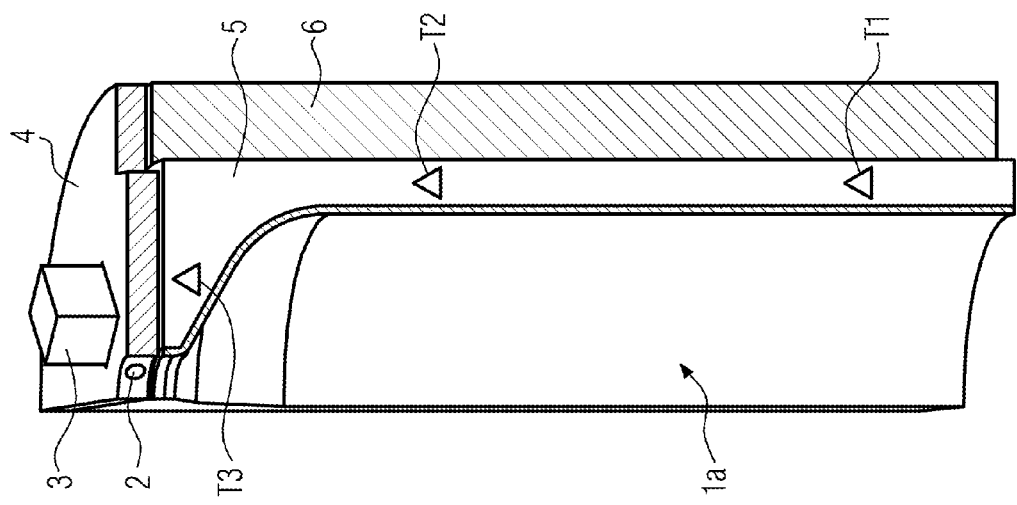

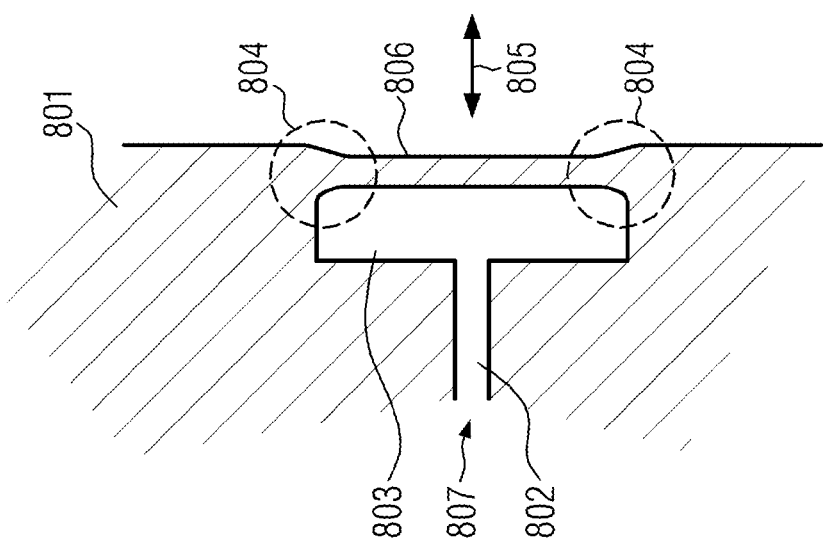

STRETCH BLOW MOLDING MACHINE WITH RAPID PROTOTYPING COMPONENTS

CROSS-REFERENCE TO RELATED APPLICATION

The present application is the US national phase of International Patent Application No. PCT/EP2012/077081, filed Dec. 28, 2012, which application claims priority of German Application No. 102012203506.0, filed Mar. 6, 2012. The priority application, DE 102012203506.0, is hereby incorporated by reference.

FIELD THE DISCLOSURE

The invention relates to a method for the production of parts, components or module components, hereinafter also referred to as components, such as components of a stretch blow molding machine for the production of containers, where the components are made of, for example, a combination of two or more different materials or material properties, respectively, using an additive rapid prototyping method, hereinafter also referred to as aRPm, such as by 3D printing or laser sintering.

BACKGROUND

The use of two or more materials can be necessary, for example, in order to fulfill different functions that are enabled by different material properties (structure, strength, density, e-module, surface roughness, etc.).

Such components frequently only being needed in small batches/small amounts are at present expensively manufactured by standard machining methods (screwing, welding, casting, bonding, etc.). These components are frequently also customized, difficult to process and therefore expensive.

Current processing methods (turning, milling, grinding, etc.) allow for no optimal design, in particular, with components conveying media, especially with ducts, tubes, valves, nozzles, etc., in particular when undercuts are necessary or special radii/geometries for a flow-optimized design. Realization of functional surfaces is also difficult, this frequently requires complex coating and finishing processing steps. The latter in the food processing or bottling field poses inter alia high demands on coatings in terms of abrasion resistance and/or durability against partly aggressive cleaning agents and on food safety.

Though the use of additive rapid prototyping methods for the production of components is becoming more widespread, such as in the aerospace industry (see WO2010/056705A2) and also in the field of the packaging industry (e.g. DE102006050396A1 describing a food processing and/or packaging machine with rapid prototyping components), in the field of container manufacturing and container treatment systems, however, in particular with stretch blow molding machines, the use of such methods is not known.

SUMMARY OF THE DISCLOSURE

The present invention is therefore based on the object, firstly, to improve the manufacture of components in terms of faster and cheaper production, to improve maintainability/faster component availability and exchangeability as well as improved and/or novel functional and material properties, and, secondly, to improve the manufacture of containers produced by such an improved stretch blow molding machine in terms of efficiency and optimization of existing form/function and material properties.

A method according to the invention for producing components of a blow molding module of a stretch blow molding machine is characterized in that, for the blow molding module of a stretch blow molding machine which can comprise, for example, a blow nozzle, a blow valve or several valves combined in a valve block, a stretching rod, a mold carrier, a shell mold and one or more single or multi-part mold inlay (s) having a container contour, the blow molding module(s) is/are produced completely or partly using an additive rapid prototyping method, such as by 3D printing or laser sintering, from metal and/or plastic materials or from a combination of metal and/or plastic materials and/or ceramic materials.

In this, the plastic materials can comprise both elastomers as well as thermoplastic materials or combinations thereof.

Individual components that were previously mounted, joined or screwed can in this manner advantageously be printed as one component and an optimal connection/strength of the two or more materials can be obtained. The component can then be produced without individual parts, for example, adhesives, mounting pieces (screws, etc.) or (crimp) fits needing to be connected to each other. Undercuts, gaps, and additional components such as screws, rings, nuts, etc. which can have an adverse affect, inter alia, on fatigue strength and permanent leak-tightness and on cleaning options as well as on the resistance to aggressive cleaning agents are in particular dispensed with. However, the component can also be composed of several individual parts if, for example, an inner valve piston is in a valve designed to be movable.

In addition, components/modules can be produced ad-hoc, i.e. directly from the computer aided design (CAD) character set. Production of the components can accordingly occur without any delivery times or setup times. Components can be produced without elaborate component mold construction in particular with components that are according to current prior art produced by casting.

Furthermore, components must advantageously not be standardized and e.g. produced in the form of large batches or maintaining a long series-production status, but can be continually improved and respectively be produced according to current the state of (optimized) design. In the event of any re-ordering, only the stored current data and character set must be retrieved and transmitted to the, for example, mobile production unit. Consequently, no warehousing of finished components is required. This is particularly advantageous when components produced according to conventional methods have a high frequency of change and or are stored in a variety of variants.

It is also possible that the component created partly or completely using an additive rapid prototyping method can be produced having continuous material transitions and/or continuous transitions in material properties.

Components can also be produced, for example, in one piece, i.e. as an integral component, which were according to prior art only manufacturable as a combination of components. Like, for example, with conventional components which are composed of at least two components and a sealing element.

A first component is in particular mentioned as an example of such a conventional combination of components that receives a second component which can move relative to the latter, for example, in a machined duct in which the second moving component is mounted, for example, using a circumferential O-ring so that the lifting motion of the movable component creates a movable sealed space that can be used, for example, for pressurization.

According to the invention, such a component combination can using aRPm be realized by a single component, in that, for example, a mounted o-ring can be replaced by resiliently flexible material between the two components, with a continuous material transition of the first component to the second movable component.

A pressure pad, e.g. movable mechanically or by compressed air, can thereby be integrated into a mold carrier using aRPm.

Furthermore, a component can be optimized in terms of the application/function of the component. Ducts for media can there be incorporated directly using aRPm. Complex processing steps for bores, ducts etc. can be dispensed with. Ducts can also be fabricated using aRPm which could otherwise not be produced, for example, with turns, flow-optimized duct shapes, ducts in undercuts. Component coatings for fulfilling functional requirements, such as aseptic coatings, can also be produced without having to resort to conventional production/coating methods.

In addition, the components, e.g., ducts, can for better surface quality, durability or functionality be printed using different material which can emanate e.g. in a flowing/continuous manner from the main material of the component to be provided with the ducts.

Generally, for example, the core or the main/base material of a component to be manufactured can be printed, for example, using inexpensive materials, whereas parts such as cooling ducts or highly resistant component surfaces can be printed using a different material which emanates in a flowing manner from, for example, the material that is cheaper or more suitable in terms of material properties.

Components with integrated tempering ducts for cooling or heating can in particular be produced by use of additive rapid prototyping methods.

When producing a single or multi-part mold inlay using additive rapid prototyping methods, for example tempering ducts can be created integrated into the mold inlay or into the valve block for cooling or heating, where the position of the tempering ducts can be optimized in terms of minimal thermal expansion. For example, the valve block can, due to the tempering ducts integrated into the valve block by use of additive rapid prototyping, be constructed such that neck cooling can be omitted or can be designed smaller/less pronounced than in prior art.

The tempering ducts integrateable into the mold inlay can follow the container contour shape and be located in close proximity, i.e. spaced no more than 1 or 2 mm from the surface of the mold inlay.

The mold carriers previously also needed to be tempered during various bottling processes (hot fill) for no material tensions to occur due to different thermal expansion coefficients. Due to the plurality of tempering ducts that can be incorporated into the mold inlay by use of additive prototyping, tempering (for example, heating the inner side of the mold inlay) can occur selectively at the inner side of the mold inlay contacting the container material (e.g., polyethylene terephthalate/PET) as is necessary for the manufacturing process of the container, whereas optimal tempering in terms of the temperature for the outer surface towards the mold inlay or the mold carrier can be adjusted by a second duct system in the same mold inlay, whereby temperature differences can be avoided that could lead to strong material expansion and thereby to the container and/or parts of the blow molding module or the stretch blow molding machine breaking or cracking. Additional separate tempering of the mold carrier can therewith possibly be omitted entirely.

More effective cooling of the containers, for example, by the tempering ducts produced by use of additive rapid prototyping, inter alia also has the advantage that the containers harden more rapidly after blowing and can be removed sooner thereby accelerating container production, and, for example, production cycle times of less that 10 s can be achieved.

The shell molds/mold carrier upper sides can preferably comprise ring-shaped ducts for supplying the tempering ducts with coolant. A ring duct $9a$ can have a tangential inlet for forcing the coolant to rotate and for ensuring uniform distribution of the cooling media. A possible second ring-shaped duct $9b$ on the shell molds/mold carrier upper sides can remove the heated coolant.

Mold inlays and/or valve blocks can also be produced or printed having additional ducts that are permeable to media or allow media to flow through the component, respectively, such as ducts that let paint, air, $H_2O_2$, etc. pass. With the aid of such ducts letting media pass, mold inlays can be again or continuously sterilized after a mold change or even during production/operation. Like the tempering ducts, these additional ducts can also be imprinted/integrated in close proximity, e.g. with a spacing of 1-2 mm to the surface of the components.

Furthermore, ducts in components such as mold inlays, valve blocks, blow nozzles, stretching rods, blow molds, mold carriers and/or mold carrier plates can be manufactured using additive rapid prototyping methods such that the inner walls of the ducts are composed of material which is resistant to aggressive media. These aggressive media could be, for example, in particular aqueous or gaseous cleaning media, such as cleansing foam or sterilization media such as $H_2O_2$. The material of the inner walls of the ducts can also assume a function and comprise, for example, a non-adhesive coating or a roll-off function, e.g. a roll-off function with respect to liquid media, similar to the so-called lotus effect.

The inner wall material of the ducts can there differ from the main/base material or the filling or stabilizing material of the actual component, or even continuously emanate from it.

Furthermore, undercuts, such as mounts and hooks $10a$, $10b$, $10c$, $10d$ and/or positive-fit connections, such as dovetail or snap-fit joints can in mold inlays or other components be integrated/printed along into the components, for example, for attaching the mold inlays within the shell mold or the mold carrier, respectively, and enable easy and/or possibly tool-free exchange of the component.

A blow molding module generally comprises at least two, but usually three mold inlays, namely, at least two mold inlays forming the sides of the container to be produced, as well as additionally at least one mold inlay for molding the container base.

As already mentioned, however, the mold inlay produced with the additive rapid prototyping method can itself be single-part or multi-part. The mold inlay can in particular be divided into two parts, where one part comprises the actual functional mold inlay and the other part serves to stabilize and/or affix the functional mold inlay.

In components, such as mold inlays, blow valves, blow nozzles, stretching rods, or valve blocks, continuous material with respective continuous transitions of material properties transitions are further possible. For example, slide bushes or valve stops can by use of aRPm be directly integrated into the component without installing an additional component. This can be done in particular, for example, for the sliding bearing or the guide of the stretching rod. Mounting devices (screws, etc.) as well as recesses, edges, covers etc., as well as the effort of producing several components with respective variants can thereby advantageously be omitted.

For example, joining planes that could become soiled could with a positive-fit realization advantageously be omitted, for example, for aseptically designed components and wear due to material fatigue/or abrasion following relative motions/twisting can be reduced. The material transition can in particular be smooth, i.e. material mixtures ensure a smooth transition of the materials and allow for optimizing the function of the respectively required material specifications.

Another characteristic of an application of flowing material transitions is e.g. as already briefly mentioned, realization of a pressure pad by use of aRPm which can be integrated into the mold carrier. Previous designs of prior art are composed of a mold carrier or a mold carrier shell in which a region is cut out (for example, by milling it out) that can receive a second component that can in a positive-fit manner trace the surface of the mold carrier. The second component is connected to the mold carrier, e.g. by a circumferential seal ring and thereby seals off a cavity in the mold carrier. This cavity can via a duct be pressurized with compressed air, whereby the second component presses outwardly, i.e. for example towards the outer surface of a container to be produced and thereby supports a mold inlay or a shell mold with additional pressure of up to 40 bar or greater within the meaning of a counter-force to the blowing pressure inside the container.

In an implementation of a pressure pad integrated into the mold carrier/the shell mold using aRPm, the connection between the mold carrier/shell mold and the second component/the pressure pad can be realized by a region of elastomeric properties, where the material of the mold carrier/the shell mold (e.g. aluminum) can first continuously transit to a permanent solid elastomer and can subsequently transit continuously to the material of the second component (e.g. aluminum) and said elastomeric connecting or transition region between the first component (e.g. the mold carrier or the shell mold, respectively) and second component (e.g. the pressure pad) can seal a cavity between the two components.

This cavity can via a duct, likewise being integrated into the mold carrier/the shell mold using aRPm, be pressurized with compressed air, whereby the second component, i.e. presently the pressure pad, can be pressed outwardly i.e. for example towards the outer surface of a container to be produced, and thereby supports a mold inlay or a shell mold with additional pressure of up to 40 bar or greater within the meaning of a counter-force to e.g. a blowing pressure possibly existing inside the container.

For example, the side/the sides of the mold inlay that is/are facing the container outer side and/or inner walls of possibly existing ducts integrated into the mold inlay (s) can additionally completely or partly be applied a functional coating, such as an aseptic coating (for example, coating with silver ion addition), and/or an non-adhesion layer (e.g. polytetrafluoroethylene/"Teflon"), and/or a corrugated layer or other desired surface structures.

The side/sides of/the mold inlays that is/are facing the container outer side and/or inner walls of possibly existing ducts integrated into the mold inlay (s) can additionally completely or partly be applied a coating exhibiting increased abrasion resistance relative to the base material of the component and/or increased resistance to aggressive media, such as $H_2O_2$.

The surface geometry and surface properties of the container produced with such a mold inlay can thereby be selectively influenced. For example, the surface of the container to be produced can be provided with a texture by mold inlays produced with aRPm that can exhibit the desired texture as a negative.

The surface of each component produced with aRPm and/or the inner walls of any possibly existing ducts integrated into the component can in general be partly or completely provided with a functional coating, such as an aseptic coating and/or a non-adhesion layer and/or a corrugated layer or other desired surface structures with increased resistance to abrasion and/or increased resistance to aggressive media, such as $H_2O_2$ as compared to the base material of the component.

Components produced by additive rapid prototyping methods such as blow nozzles, a stretching rod, blow valves and/or the valve block/s can in particular be covered partly or completely with an aseptic coating.

When producing a blow valve and/or a valve block by use of additive rapid prototyping from metal and/or plastic materials such as aluminum, air ducts optimized, for example, according to flow behavior, can be produced in that non-circular cross-sections are realized and/or, for example, no material is printed there but, for example, asymmetric or irregularly shaped cross-sections are created.

Stretching rods can be produced with aRPm such that they contain ducts that allow media to pass, e.g. air ducts, which can fulfill additional functions such as enabling tempering of the container interior by air supply.

Furthermore, a stretching rod produced by use of aRPm can be designed as a hollow stretching rod and can then serve e.g. as a filling lance for filling the container, e.g. with a product or a sterilization medium.

The component produced by use of aRPm, such as a valve block, can in particular per se be made, for example, of plastic or aluminum for the shaping structure, and any possible ducts that allow media to pass, e.g. air passages, can be made of other special materials, such as ceramic materials or stainless steel alloys in order to be able to obtain, for example, resistance to $H_2O_2$ of the ducts that allow media to pass.

The material properties of a functional coating of the component produced by use of aRPm can therefore in general differ from the material properties of the base or structural material of the component in terms of density, strength, hardness, surface roughness, abrasion resistance, etc.

Especially the optimization of the surface quality of components is advantageous e.g. for aseptic versions because undesired deposits on surfaces can be minimized.

Air ducts can likewise be realized which would be very difficult to realize with previous manufacturing methods, such as reductions of cross-sections in the component and such as avoidance of nozzles/valves that would otherwise need to be used/attached.

The mount for the blow valve, for slide bushes, etc. in the valve block and/or for the blow nozzle can using additive rapid prototyping additionally be produced without any allowance for clearance. The blow valve can be printed directly integrated into the valve block. Movable components can also be printed into components, for example a movable blow valve or valve pistons/valve stems in a valve block. This has the advantage of significantly fewer screw connections as no valve piston must be inserted, and little assembly and adjustment effort.

Weight saving is furthermore possible, for example, with the aid of components optimized by simulation and the possibly resulting avoidance of excess material usage.

Possible materials for the production of components using aRPm are, inter alia: thermoplastic, polyether ketone PEEK and its derivatives (PEEEK, PEK, etc.), polyamide, etc., as well as metallic printable materials such as ALUMIDE (PA12+aluminum), or ceramics such as silicon carbide.

Further advantages and a better understanding of the present invention will result from the following accompanying exemplary drawings.

BRIEF DESCRIPTION OF THE SEVERAL VIEWS OF THE DRAWINGS

FIG. 1 illustrates a perspective cross-section through the blow molding module BFM1 of a stretch blow molding machine.

FIG. 2 illustrates a perspective cross-section through an alternative blow molding module BFM2 of a stretch blow molding machine.

FIG. 8 illustrates an enlarged cross-section of a component.

DETAILED DESCRIPTION OF THE PREFERRED EMBODIMENTS

FIG. 1 by way of example shows parts of the blow molding module BFM1 of a stretch blow molding machine in which the mold inlay having a container contour 1a and/the valve block 3 and/or the blow valve 2 are advantageously produced by use of an additive rapid prototyping method. The blow molding module is advantageously divided in two so that the container can be removed after blowing, i.e. the mold carrier and the shell mold are divided into two halves, where the shell mold halves can each accommodate a single or multi-part mold inlay. It is also possible, however, that the blow molding module or the mold carrier and the shell mold can be divided into more than two parts.

After blowing the container in a blow molding module BFM2, as shown in FIG. 2, one can make use of the physical effect that compressed air cools when it is relaxed in the following manner.

One can after completed blowing relax part of the blowing air via the blowing nozzle and/or other additional valves into a cavity 7 (under ambient pressure) in the mold carrier and/or in the mold shell, for example, from a pressure of up to 40 bar or greater to a pressure of close to or equal to 0 bar. The cold temperature resulting during relaxation can then be directed, for example, in the direction of the container or the mold inlay using aluminum cooling fins on the shell mold and/or the mold carrier. The container or mold inlay can alternatively be cooled via a closed fluid circuit (or several) by means of gravity circulation or simply due to the thermal conductivity of the material (aluminum, Alumide, plastic, etc.). Temperature control can thereby be effected inter alia by additional valves and temperature sensors (T1, T2, T3) in the mold carrier and/or the shell mold in order to be able to guide the blowing air into the cavity as needed.

Figure 3:
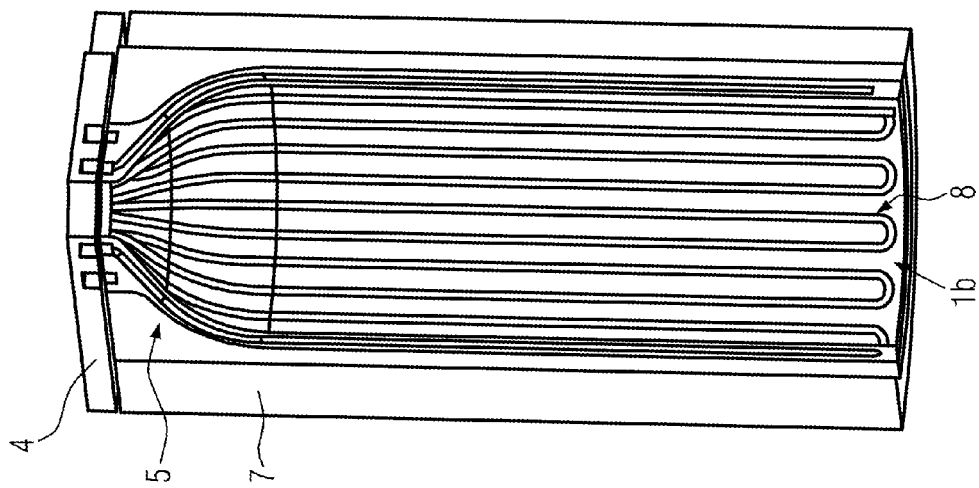
FIG. 3 illustrates a perspective cross-section through an alternative blow molding module BFM3 of a stretch blow molding machine.

Tempering ducts 8 can also as exemplified in FIG. 3 by use of an additive rapid prototyping method be integrated into the mold inlay 1b and follow the contour of the container and be located in close proximity (1-2 mm) to the mold inlay surface in order to thereby be able to effect cooling or heating of the container and the mold inlay.

A homogeneous temperature profile can be created by the tempering ducts 8 which can be of advantage in particular when using mold inlay materials with low thermal conductivity, such as with thermal conductivities $\lambda<10$.

Figure 4:
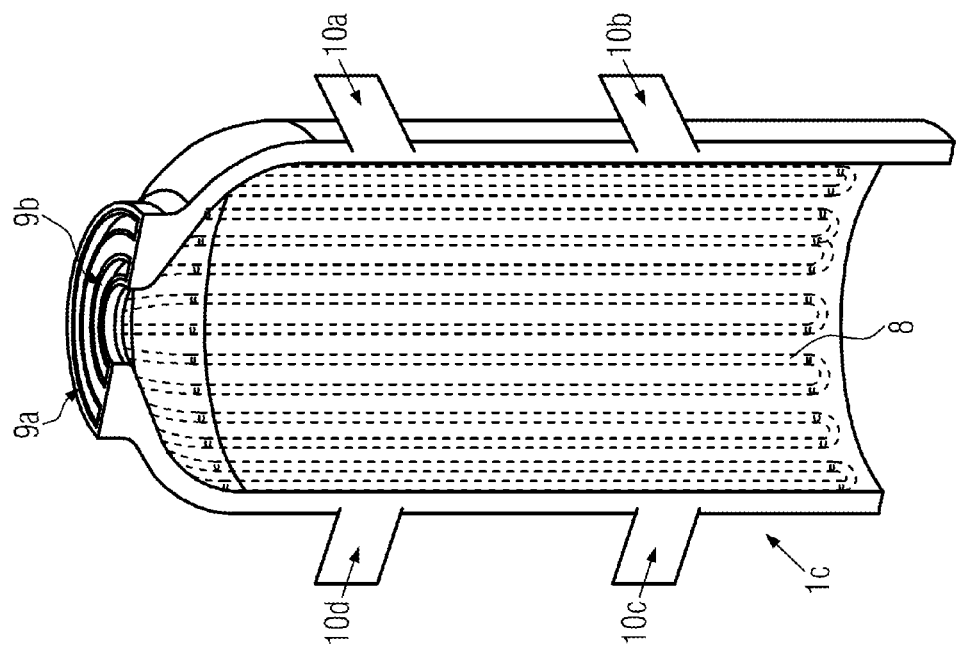
FIG. 4 illustrates a transparent three-dimensional view of a mold inlay.

A mold inlay 1c produced by use of additive rapid prototyping and having a container contour and tempering ducts, as exemplified in FIG. 4, can comprise additionally printed undercuts, such as hooks 10a, 10b, 10c, 10d, and/or positive-fit connections, such as dovetail or snap-fit joints for attaching the mold inlay in the shell mold.

Figure 5:
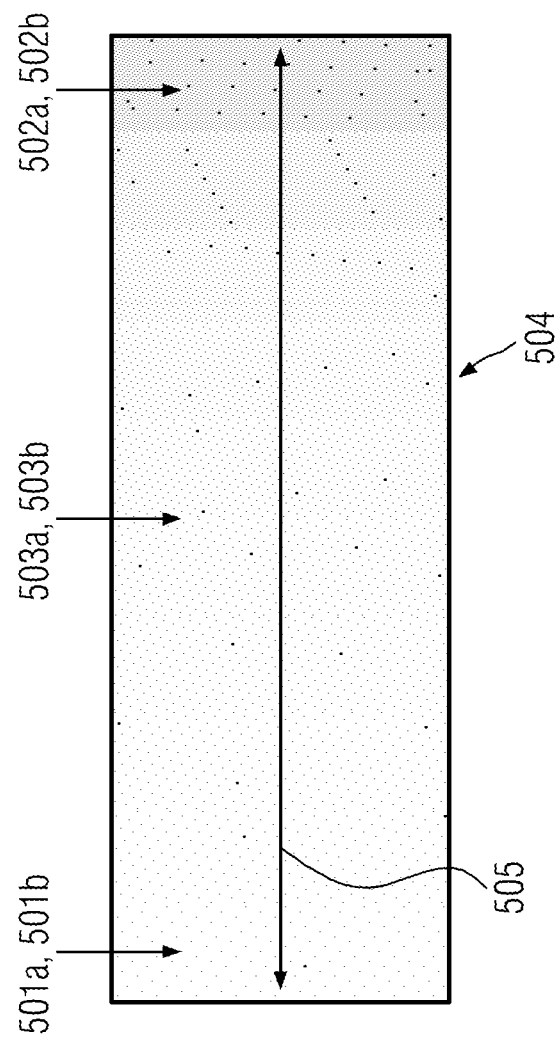
FIG. 5 illustrates a component manufacture using aRPm that that can be used in a stretch molding machine.

FIG. 5 by way of example shows a component 504 manufactured using aRPm that can be used, for example, in a stretch blow molding machine and in which two different materials or material properties, 501a, 502a merge in a flowing/continuous 505 manner. For example, the region 501b of component 504 can be 100% made of material/material property 501a and component region 502b can be made 100% of material/material property 502a. In component region 503b, there can be a ratio of 50:50% between material/material properties 501a and 502a.

Application of flowing material transitions can be particularly advantageous at the outer edge areas of components or in the inner walls of ducts within components. This allows, for example, a component to be made of a core providing stability and/or shape or a hollow structure with branches providing stability and/or shape, for example, of bionic nature, in order to, for example, save weight mass while simultaneously providing high strength in areas where a lightweight structure is advantageous.

In addition, the component surface or e.g. the inner sides of the ducts can in the framework of aRPm be provided with a functional coating to protect against abrasion, for easier cleanability, resistance to aggressive environmental media such as cleaning solutions, $H_2O_2$ (esp. when material providing stability is made e.g. of aluminum). Examples of different material properties are presently in particular Shore hardness, bending and tensile strength, and density. It is therefore conceivable, for example, to manufacture the core of the piston valve/valve stem of a valve block with a lower Shore hardness and/or lower density than the functional surface of the valve piston/valve stem. This can advantageously lead to savings in weight and/or material costs.

In a valve block, for example, in particular at critical stress points, suitable materials can be printed that merge in a flowing manner and comprise no joining surfaces or gaps. Due to the flowing material transitions, optimal combination of different materials/material properties can be ensured.

Printing/or producing softer sealing material onto a harder material by use of aRPm is mentioned as another example. Instead of using, for example, O-rings as seals between two components, such as between two tubes, the sealing material can be printed at the functionally desired location in a flowing transition between the components made of harder material. In this manner, any gaps can advantageously be dispensed with that would make aseptic cleaning difficult without damaging the sealing connection in continuous use, e.g. due to mechanical expansion under temperature application.

It is also possible to combine more than two materials/material properties in a single component and let them merge continuously into each other.

Figure 6:
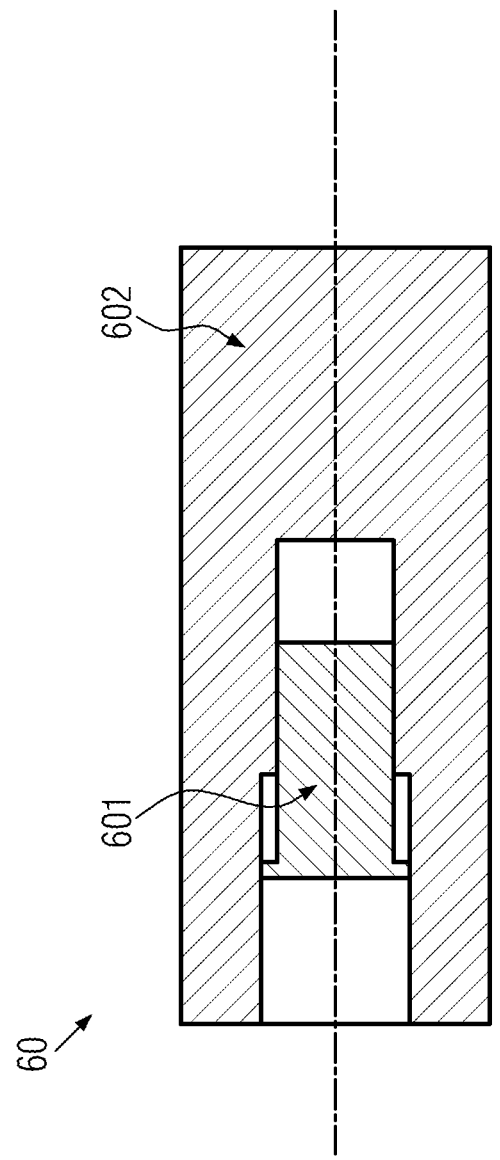
FIG. 6 illustrates a component manufactured using aRPm, which can be workin conjunction with a movable component using aRPm, such as a valve piston or valve stem.

FIG. 6 by way of example shows a component 60 manufactured by use of aRPm that can be used, for example, in a stretch blow molding machine in which the component 602 can be integrated or printed into a movable component 601 using aRPm, for example, a valve piston/a valve stem.

Figure 7:
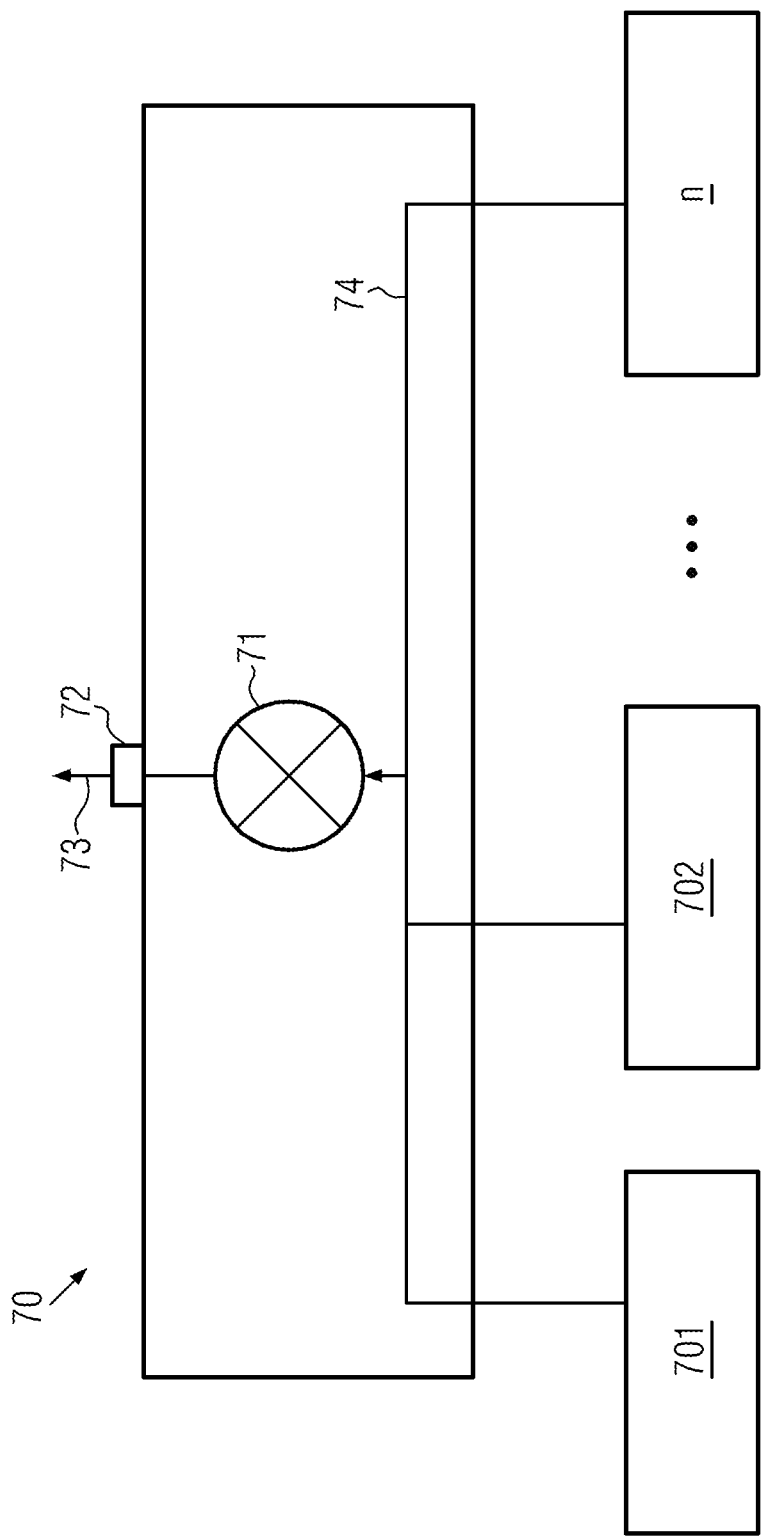
FIG. 7 schematically illustrates unit for additive rapid prototyping.

FIG. 7 illustrates an example of a unit 70 for aRPm in which various and virtually any number of materials 701, 702, . . . , n, can be supplied to a mixing unit 71, 74, can be mixed therein, and printed 73, for example, via a print head 72 in any random combination of the original materials 701, 702, . . . , n.

FIG. 8 as an example shows a cross-section detail of a component 801 produced by use of aRPm, e.g. a detail of a mold carrier or a shell mold in which a pressure pad 806 can be integrated using aRPm. The transition region or connection region 804, respectively, between component 801 and pressure pad 806 can thereby have elastomeric material properties, whereas the material properties/the materials of component 801 and pressure pad 806 can merge continuously into each other. Compressed air 807 can via a duct 802, that can also be produced by use of aRPm, be supplied to the cavity 803 between component 801 and pressure pad 806 and thereby cause printing pad 806 to undergo a relative motion 805 relative to component 801 and pressure can thereby be applied, for example, towards the outside surface of the container to be produced, for example, within the meaning of a counter-force to the blowing pressure in the interior of the container.

What is claimed is:

1. A method for producing one or more components for a blow molding module of a stretch blow molding machine, each of the components to be produced comprising at least one of a group including a blow valve, a blow nozzle, a valve block, a stretching rod, a mold carrier, a shell mold, and one or more single- or multi-part mold inlays, with a container contour, wherein each of the components to be produced is completely or partly produced by use of an additive rapid prototyping method, and is produced from at least one of a group including metal, plastic materials, ceramic materials, and combinations of at least two of metal, plastic materials, or ceramic materials, and wherein producing the components partly or completely by the use of the additive rapid prototyping method includes producing the components with at least one of continuous material transitions or continuous transitions in material properties.

2. The method according to claim 1, the components are produced with integrated tempering ducts for cooling or heating.

3. The method according to claim 2, further including, in producing the components, providing additional ducts that allow media to pass.

4. The method according to claim 2, further including producing the components with integrated tempering ducts that follow the container contour, the integrated tempering ducts having a spacing of no more than 2 mm to the surface of the mold inlays.

5. The method according to claim 1, further including, in producing the components, providing the components with undercuts.

6. The method according to claim 5, wherein the undercuts include at least one of hooks or positive-fit connections that serve to attach the mold inlays within the shell mold or the mold carrier, respectively.

7. The method according to claim 1, further including providing the surface of the components with a functional coating including at least one of an aseptic coating, a non-adhesion layer, a corrugated layer, or other surface structures, a coating with increased resistance to abrasion, or increased resistance to aggressive media as compared to a base material of the components.

8. The method according to claim 1, further including, in producing the components, integrating a pressure pad into one of the mold carrier or shell mold by use of the adaptive rapid prototyping method, and producing a connection region between the mold carrier and the pressure pad or between the shell mold and the pressure pad made from elastomeric material, the elastomeric material of the connection region continuously transitioning to a material of the mold carrier or the shell mold.

9. A blow molding module of a stretch blow molding machine, comprising at least one of a group including:
   a blow valve,
   a blow nozzle,
   a valve block,
   a stretching rod,
   a mold carrier,
   a shell mold, and
   one or more single- or multi-part mold inlays with a container contour, the blow molding module defining one or more interchangeable components of the stretch blow molding machine, and the components comprising at least one of continuous material transitions or continuous transitions in material properties.

10. The blow molding module according to claim 9, wherein the components defined by the blow molding module comprises at least one of metal, plastic material, ceramic material, or combinations of at least two of metal, plastic material, and ceramic material.

11. The blow molding module according to claim 9, wherein the mold inlays and/or the valve block comprises integrated tempering ducts for cooling or heating.

12. The blow molding module according to claim 9, wherein at least one of the mold inlays, the valve block, the blow nozzle or the stretching rod includes ducts that allow media to pass.

13. The blow molding module according to claim 9, wherein the components comprise at least one of air ducts, additional ducts that allow media to pass, or tempering ducts that exhibit optimized flow characteristics due to at least one of non-circular or asymmetrical cross-sections.

14. The blow molding module according to claim 9, wherein the surface of the components at least partially comprises at least one of a functional coating, a non-adhesion layer, a corrugated layer or other surface structures, a coating with increased resistance to abrasion, or a coating having increased resistance to aggressive media as compared to a base material of the components.

15. The blow molding module according to claim 9, wherein the blow molding module comprises at least a mold carrier including a print head and a mold inlay comprising a recess for the print head.

16. The blow molding module according to claim 9, wherein the components comprise integrated movable components.

17. The blow molding module according to claim 9, wherein the blow molding module comprises a shell mold having an integrated pressure pad, a connection region between the mold carrier and the pressure pad or between the shell mold and the pressure pad made from elastomeric material, the elastomeric material of the connection region continuously transitioning to a material of the mold carrier or the shell mold, and wherein the blow molding module comprises a cavity with a compressed air supply duct between the pressure pad and the mold carrier or between the pressure pad and the shell mold.

18. A method for producing containers using a blow molding module of a stretch blow molding machine, the blow molding module of the stretch blow molding machine producing the containers comprising one or more components selected from a group including a blow valve, a blow nozzle, a valve block, a stretching rod, a mold carrier, a shell mold, one or more single- or multi-part mold inlays with a container contour, wherein at least one of the one or more components is produced by an additive rapid prototyping method and is produced from one or more of metal plastic materials, ceramic materials, or one or more of a combination of metal, plastic materials, or ceramic materials, and wherein producing the at least one of the one or more components by the use of the additive rapid prototyping method includes producing the at least one of the one or more components with at least one of continuous material transitions or continuous transitions in material properties.

19. The method according to claim 18, further including, in producing the at least one of the one or more components, forming integrated tempering ducts for at least one of cooling or heating.

20. The method according to claim 19, further including, in producing the at least one of the one or more components, providing the blow molding module with additional ducts that allow media to pass.

21. The method according to claim 20, wherein the blow molding module includes a mold carrier that comprises a print head and at least a part of the additionally produced ducts of the mold inlays are color supply ducts and the containers are imprinted with color by the print head which is controlled by blowing pressure.

* * * * *